(12) United States Patent
Köyer et al.

(10) Patent No.: US 10,287,647 B2
(45) Date of Patent: May 14, 2019

(54) METHOD FOR PRODUCING A STEEL COMPONENT HAVING A METAL COATING PROTECTING IT AGAINST CORROSION, AND STEEL COMPONENT

(71) Applicant: THYSSENKRUPP STEEL EUROPE AG, Duisburg (DE)

(72) Inventors: Maria Köyer, Dortmund (DE); Sascha Sikora, Lünen (DE); Janko Banik, Altena (DE); Manuela Ruthenberg, Dortmund (DE); Jennifer Schulz, Unna (DE)

(73) Assignee: THYSSENKRUPP STEEL EUROPE AG, Duisburg (DE)

( * ) Notice: Subject to any disclaimer, the term of this patent is extended or adjusted under 35 U.S.C. 154(b) by 560 days.

(21) Appl. No.: 14/917,899

(22) PCT Filed: Jul. 15, 2014

(86) PCT No.: PCT/EP2014/065141
§ 371 (c)(1),
(2) Date: Mar. 9, 2016

(87) PCT Pub. No.: WO2015/036151
PCT Pub. Date: Mar. 19, 2015

(65) Prior Publication Data
US 2016/0222484 A1    Aug. 4, 2016

(30) Foreign Application Priority Data
Sep. 13, 2013 (EP) .................................... 13184274

(51) Int. Cl.
*C21D 9/00* (2006.01)
*C21D 8/00* (2006.01)
(Continued)

(52) U.S. Cl.
CPC .......... *C21D 9/0068* (2013.01); *B32B 15/012* (2013.01); *B32B 15/013* (2013.01);
(Continued)

(58) Field of Classification Search
CPC .... C23C 2/06; C23C 2/26; C23C 2/28; C23C 2/40; C23C 2/12; C23C 30/00;
(Continued)

(56) References Cited

U.S. PATENT DOCUMENTS

| | | | | |
|---|---|---|---|---|
| 6,635,359 B1 * | 10/2003 | Kurosaki | .................. | C23C 2/06 428/648 |
| 2010/0294400 A1 * | 11/2010 | Lupp | ........................ | C21D 7/02 148/518 |
| 2012/0164472 A1 * | 6/2012 | Kuhn | ........................ | C21D 1/18 428/621 |

FOREIGN PATENT DOCUMENTS

| | | |
|---|---|---|
| DE | 102009007909 A1 | 8/2010 |
| DE | 102010017354 A1 | 12/2011 |

(Continued)

OTHER PUBLICATIONS

English Translation of Int'l Search Report for PCT/EP2014/065141 dated Nov. 6, 2014 (dated Nov. 13, 2014).
(Continued)

*Primary Examiner* — Michael E. La Villa
(74) *Attorney, Agent, or Firm* — The Webb Law Firm

(57) ABSTRACT

A steel component formed from a flat steel having a yield point of 150-1100 MPa and a tensile strength of 300-1200 MPa and coated with an anticorrosion coating of an alloy that includes 35-70% by weight aluminum, 35-60% by weight zinc, 0.1-10% by weight magnesium, up to 10% by weight Si, and up to 5% by weight Fe. A blank obtained from the flat steel product is heated to at least 800° C. and formed into the steel component. Alternatively, the steel component may be formed into the steel component first and then heated
(Continued)

to at least 800° C. Regardless, the steel component may then be hardened by sufficiently rapid cooling the steel component from a sufficiently high temperature.

19 Claims, 2 Drawing Sheets

(51) Int. Cl.
| | |
|---|---|
| C21D 6/00 | (2006.01) |
| C21D 1/18 | (2006.01) |
| C23C 2/12 | (2006.01) |
| C23C 2/28 | (2006.01) |
| C23C 2/40 | (2006.01) |
| C23C 2/06 | (2006.01) |
| C22C 38/38 | (2006.01) |
| C22C 38/32 | (2006.01) |
| C22C 38/28 | (2006.01) |
| C22C 38/06 | (2006.01) |
| C22C 38/04 | (2006.01) |
| C22C 38/02 | (2006.01) |
| C22C 18/04 | (2006.01) |
| C22C 21/10 | (2006.01) |
| B32B 15/01 | (2006.01) |
| C23C 28/02 | (2006.01) |
| C23C 30/00 | (2006.01) |
| B32B 15/04 | (2006.01) |
| C23C 28/00 | (2006.01) |
| B32B 15/18 | (2006.01) |
| B32B 15/20 | (2006.01) |
| C22C 18/00 | (2006.01) |
| C22C 21/00 | (2006.01) |
| C23C 2/26 | (2006.01) |
| C22C 30/06 | (2006.01) |
| C22C 38/00 | (2006.01) |
| C22C 38/14 | (2006.01) |
| C22C 38/18 | (2006.01) |

(52) U.S. Cl.
CPC ............ *B32B 15/04* (2013.01); *B32B 15/043* (2013.01); *B32B 15/18* (2013.01); *B32B 15/20* (2013.01); *C21D 1/18* (2013.01); *C21D 6/002* (2013.01); *C21D 6/005* (2013.01); *C21D 6/008* (2013.01); *C21D 8/005* (2013.01); *C22C 18/00* (2013.01); *C22C 18/04* (2013.01); *C22C 21/00* (2013.01); *C22C 21/10* (2013.01); *C22C 30/06* (2013.01); *C22C 38/002* (2013.01); *C22C 38/02* (2013.01); *C22C 38/04* (2013.01); *C22C 38/06* (2013.01); *C22C 38/14* (2013.01); *C22C 38/18* (2013.01); *C22C 38/28* (2013.01); *C22C 38/32* (2013.01); *C22C 38/38* (2013.01); *C23C 2/06* (2013.01); *C23C 2/12* (2013.01); *C23C 2/26* (2013.01); *C23C 2/28* (2013.01); *C23C 2/40* (2013.01); *C23C 28/02* (2013.01); *C23C 28/021* (2013.01); *C23C 28/025* (2013.01); *C23C 28/321* (2013.01); *C23C 30/00* (2013.01); *C23C 30/005* (2013.01); *Y10T 428/12757* (2015.01); *Y10T 428/12799* (2015.01); *Y10T 428/12937* (2015.01); *Y10T 428/12944* (2015.01); *Y10T 428/12951* (2015.01); *Y10T 428/12958* (2015.01); *Y10T 428/12972* (2015.01); *Y10T 428/12979* (2015.01); *Y10T 428/24967* (2015.01); *Y10T 428/24975* (2015.01); *Y10T 428/263* (2015.01); *Y10T 428/264* (2015.01); *Y10T 428/265* (2015.01)

(58) Field of Classification Search
CPC ... C23C 30/005; C23C 28/021; C23C 28/025; C23C 28/321; C23C 28/02; C22C 38/18; C22C 38/04; C22C 38/02; C22C 38/38; C22C 38/32; C22C 38/28; C22C 38/06; C22C 38/002; C22C 38/14; C22C 18/00; C22C 18/04; C22C 21/00; C22C 21/10; C22C 30/06; C21D 9/0068; C21D 8/005; C21D 6/008; C21D 6/005; C21D 1/18; C21D 6/002; B32B 15/012; B32B 15/013; B32B 15/04; B32B 15/043; B32B 15/18; B32B 15/20; Y10T 428/24967; Y10T 428/24975; Y10T 428/263; Y10T 428/264; Y10T 428/265; Y10T 428/12799; Y10T 428/12757; Y10T 428/12944; Y10T 428/12937; Y10T 428/12951; Y10T 428/12958; Y10T 428/12972; Y10T 428/12979
See application file for complete search history.

(56) References Cited

FOREIGN PATENT DOCUMENTS

| | | |
|---|---|---|
| DE | 102010030465 A1 | 12/2011 |
| DE | 102011001140 A1 | 9/2012 |
| EP | 0480122 A2 | 4/1992 |
| EP | 1225246 A1 | 7/2002 |
| EP | 2045360 A1 | 4/2009 |
| EP | 2290133 A1 | 3/2011 |
| JP | 2001115247 A | 4/2001 |
| JP | 2002129300 A | 5/2002 |
| JP | 2010501731 A | 1/2010 |
| JP | 2011511162 A | 4/2011 |
| JP | 2013503254 A | 1/2013 |
| JP | 2013534971 A | 9/2013 |
| WO | 2008025066 A1 | 3/2008 |

OTHER PUBLICATIONS

English Language Abstract for EP2290133A1.
Drillet P et al, "Study of cracks propagation inside the steel on press hardened steel zinc based coatings," Metallurgia Italiana, Associazione Italiana Di Metallurgia, Milan, IT, vol. 104. No. 1, Jan. 1, 2012 (Jan. 1, 2012), XP009176187 (ISSN: 0026-0843).
Hong, Yan, "New Technology for Metal Surface Treatment", Beijing Press: Metallurgical Industry Press, (Oct. 1996), ISBN 7-5024-1886-5. *Concise explanation of relevance: Cited in office action dated Jun. 13, 2017 of Chinese counterpart application No. CN 201480050585.6 attached as NPL.
Office Action issued in Chinese counterpart application No. 201480050585.6 dated Jun. 13, 2017.

\* cited by examiner

METHOD FOR PRODUCING A STEEL COMPONENT HAVING A METAL COATING PROTECTING IT AGAINST CORROSION, AND STEEL COMPONENT

CROSS REFERENCE TO RELATED APPLICATIONS

This application is a U.S. National Stage Entry of International Patent Application Serial Number PCT/EP2014/065141 filed Jul. 15, 2014, which claims priority to European Patent Application No. EP 13184274.2 filed Sep. 13, 2013, the entire contents of both of which are incorporated herein by reference.

FIELD

The present disclosure relates to methods for producing steel components with metallic coatings to protect against corrosion.

BACKGROUND

References here to "flat steel products" are to steel strips, steel sheets, or blanks and the like obtained from them.

In order to offer the combination of low weight, maximum strength, and protective effect that is required in modern-day bodywork construction, components hot-press-formed from high-strength steels are nowadays used in those areas of the bodywork that may be exposed to particularly high loads in the event of a crash.

In hot press hardening, also called hot forming, steel blanks provided from cold-rolled or hot-rolled steel strip are heated to a forming temperature, which is generally located above the austenitization temperature of the respective steel, and are placed in the heated state into the die of a forming press. In the course of the forming that is subsequently carried out, the sheet blank or the component formed from it undergoes rapid cooling as a result of contact with the cool die. The cooling rates here are set so as to produce hardened microstructure in the component.

One typical example of a steel suitable for hot press hardening is known by the designation "22MnB5" and can be found in the 2004 German steel codex (Stahlschlüssel) under material number 1.5528.

In practice, the advantages of the known manganese-boron steels which are particularly suitable for hot press hardening are balanced by the disadvantage that, generally speaking, manganese-containing steels are unstable toward wet corrosion and are difficult to passivate. This tendency, which is strong by comparison with less highly alloyed steels, on exposure to elevated chloride ion concentrations, toward corrosion which, while locally limited, is nevertheless intensive makes it difficult for steels belonging to the high-alloy steel sheet materials group to be used, particularly in bodywork construction. Moreover, manganese-containing steels have a tendency toward surface corrosion, thereby likewise restricting the spectrum of their usefulness.

It is known from investigations, moreover, that in the case of temperable Mn—B steels for complex, crash-critical structural components in vehicle bodies, under adverse conditions, as for example on increased hydrogen introduction and in the presence of elevated tensile stresses, during the fabrication or the further processing of these steels, there is potentially a risk of hydrogen embrittlement and/or of the incidence of delayed, hydrogen-promoted cracking. The introduction of hydrogen is favored by the relatively high accommodation capacity of the steel substrate in the austenitic microstructure state during the annealing treatment.

Various proposals exist in the prior art aimed at reducing the hydrogen absorption of manganese-containing steels during the tempered state and/or else at providing such steels with a metallic coating that protects the steel from corrosive attack. Distinctions are made between active and passive anticorrosion systems.

Active anticorrosion systems are customarily produced by continuous application of a zinc-containing anticorrosion coating. Passive anticorrosion systems, in contrast, are produced typically by application of an aluminum-based coating which affords a good barrier effect to corrosive attacks.

Known metallic, zinc-containing anticorrosion coatings have negative and positive aspects.

In a method known from EP 2 290 133 A1 for producing a steel component provided with metallic corrosion protection, a zinc-nickel alloy coating is deposited electrolytically on a steel strip. The strip speeds possible are low as a result of the electrolytic coating operation, and this raises the production costs. As a result of intercalated zinc phases, however, active corrosion protection after hot forming (hot press hardening) is ensured. In comparison to zinc-containing anticorrosion coatings produced by hot dip coating, there is a greater welding range for spot resistance welding according to standard parameters of SEP 1245.

Steel blanks with zinc-based anticorrosion coatings that have a high zinc fraction in the range of at least 85 wt % and at most 98 wt % and that are applied by means of hot dip coating lines to a steel strip that is to be coated can be processed only in a costly indirect hot forming operation. The SEP 1245 welding ranges for spot resistance welding that are achievable in the case of steel components with zinc-based anticorrosion coatings of this kind, after hot forming, are at a very low level. As a result of the relatively low melting temperature of this coating material, low bath temperatures are operated, and this lowers, or makes relatively favorable, the production costs for the zinc-based coating in comparison to those for an AlSi coating. With zinc-based coatings of this kind, however, their low melting temperature results in a high risk of zinc-infiltrated cracking (liquid phase embrittlement). The oxide phases (generally aluminum oxide) that are positive for the evaporation behavior, moreover, are typically deliberately removed at the surface after press hardening. As a result, a substantially pure zinc-iron coating is present on the press-hardened component.

In the likewise-known galvannealing process, the zinc coating on a steel strip is converted by means of an additional annealing step into a zinc-iron alloy layer, in order to raise the concentration of iron in the coating to more than 40 wt %. But zinc coatings of this kind, enriched with iron for direct hot forming, have active corrosion protection only during a short processing window in hot forming. Components which have been heated for too long no longer provide active corrosion protection. Process times that are too short may result, as in the case of other zinc-based anticorrosion coatings, to zinc-infiltrated cracking, in turn. The oxide phases (generally aluminum oxide) that are positive for the evaporation behavior, moreover, are typically removed at the surface after press hardening in the case of the galvannealing process as well. As a result, a substantially pure zinc-iron coating is present on the press-hardened component.

With existing aluminum-based anticorrosion coatings as well there are a number of adverse aspects. For instance, the energy consumption of a hot dip coating line for producing AlSi coatings is relatively high, owing to the high melting temperature of the coating material. Furthermore, on manganese-boron steels, these coatings can be cold-formed only to a certain extent. On account of a hard intermetallic Fe—Al—Si phase, the cold-forming operation is accompanied by instances of flaking of the coating. As a result, degrees of forming are restricted. In general, therefore, the AlSi coatings require direct hot forming. In combination with a cathodic electrodeposition coating, which allows the coating film to adhere well to the surface of the AlSi coating, a good barrier effect with respect to corrosive attacks can be obtained. With this coating variant, moreover, it is necessary to consider the introduction of hydrogen into the steel material, which may necessitate the use of dew point regulation in the continuous oven for the press hardening process if process conditions are adverse. The energy consumption associated with dew point regulation gives rise to additional costs in component manufacture.

Therefore, a need exists for methods that can be carried out simply in practice and that allow for the production at comparatively low cost and complexity of steel components having well-adhering metallic coatings that protect against corrosion.

DETAILED DESCRIPTION

Figure 1:
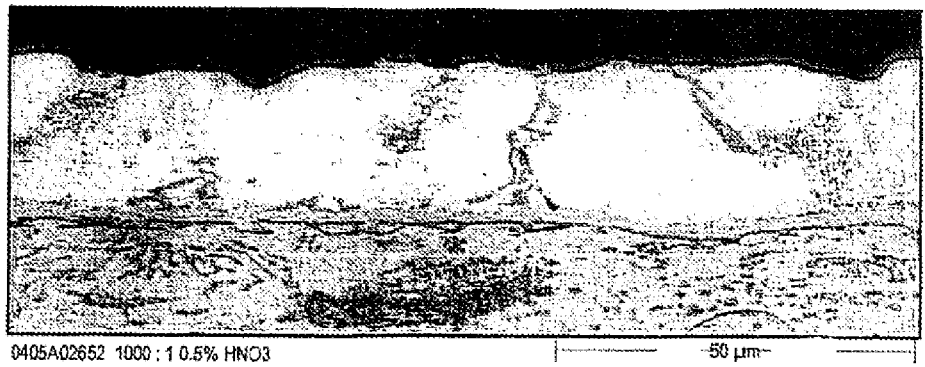
FIG. 1 is a close-up of a polished section of an example Mn-B steel substrate coated according to a method of the present disclosure, wherein the example Mn-B steel substrate corresponds to an initial state of the coated steel substrate.
Figure 2:
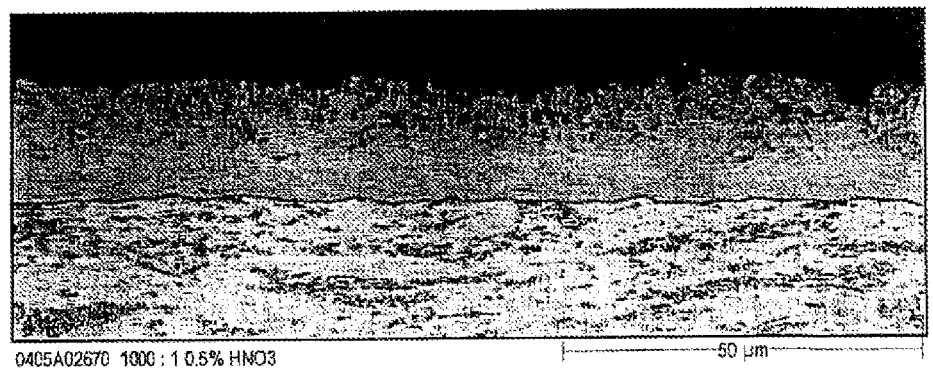
FIG. 2 is a close-up of a polished section of an example steel substrate coated according to a method of the present disclosure and taken after lying for five minutes after having been heated to a temperature of 700 degrees Celsius.
Figure 3:
FIG. 3 is a close-up of a polished section of an example steel substrate coated according to a method of the present disclosure and taken after lying for five minutes after having been heated to a temperature of 800 degrees Celsius.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

The present disclosure generally concerns methods for producing steel components with metallic coatings for protecting against corrosion. According to some example methods, a flat steel product consisting of a Mn steel may be formed wherein the flat steel product includes an aluminum-zinc alloy coating applied prior to the forming of the steel component.

More particularly, some example methods relate to the forming of the steel component by 'direct hot forming' (direct press hardening), while other example methods relate to the forming of the steel component in an 'indirect method' (indirect press hardening), where a steel blank coated in accordance with the invention is first of all cold-formed, then heated to austenitization temperature, and subsequently converted by rapid cooling into the tempered or hardened microstructure state.

Advantageous refinements of the method variants of the invention are specified in the claims which refer back to claim 1 or 2, and are elucidated below.

In respect of the steel component, the solution provided by the invention to the object stated above is that such a component has the features specified in claim 13. Advantageous variants of the steel component of the invention are specified in the claims which refer back to claim 13, and are elucidated below.

In a method of the invention for producing a steel component provided with a metallic coating providing protection from corrosion, first of all a flat steel product, i.e., a steel strip or steel sheet, is provided, produced from steel material which is hardenable by quenching in a hot forming operation. This material has a yield point of 150 to 1100 MPa and a tensile strength of 300 to 1200 MPa.

This steel material may typically comprise a high-strength manganese-boron steel in conventional composition. Accordingly, as well as iron and unavoidable impurities, the steel processed in accordance with the invention may comprise (in wt %) 0.2-0.5% C, 0.5-3.0% Mn, 0.002-0.004% B, and also, optionally, one or more elements of the "Si, Cr, Al, Ti" group in the following amounts: 0.1-0.3% Si, 0.1-0.5% Cr, 0.02-0.05% Al, 0.025-0.04% Ti.

The method of the invention is suitable for producing steel components both from hot strip or hot sheet which has only been conventionally hot-rolled, and from steel strip or steel sheet which has been conventionally cold-rolled.

The flat steel product constituted and provided accordingly is coated with an anticorrosion coating, this coating being composed in accordance with the invention of an aluminum-zinc alloy which comprises 35-70 wt % aluminum, 35-60 wt % zinc, 0.1-10 wt % Si, and up to 5 wt % Fe. Moreover, this aluminum-zinc alloy may preferably comprise up to 15 wt % of other elements which have affinity for oxygen, such as magnesium, calcium, nickel and/or manganese, for example.

The aluminum-zinc alloy used in accordance with the invention may be applied by means of a hot dip coating operation, electrolytically, or by means of a piece coating operation to the flat steel product provided. Preferably, however, the aluminum-zinc alloy is applied by means of a continuous hot dip coating operation. The metallic coating may be applied both to hot-rolled and to cold-rolled flat steel products.

Analyses of flat steel products produced in accordance with the invention and also of steel components produced from them by hot forming (press hardening) found the following layer composition (layer sequence) for their metallic coating after temperature treatment at 900° C.:
1. outer layer of aluminum-iron phases with zinc-rich phases,
2. interlayer of an aluminum-rich aluminum-iron compound,
3. diffusion layer (Al-rich Fe solid solution), and
4. steel substrate (Mn or Mn—B steel)

The aluminum-zinc alloy used in accordance with the invention has the zinc fraction which endows it with active corrosion control and at the same time the aluminum fraction which endows it with passive corrosion control.

Through the alloying-in of elements such as magnesium and/or calcium, a reduction in the hydrogen content can be achieved as a result of binding by these elements. Accordingly, even at relatively high oven-atmosphere humidity, reliable fabrication, especially forming, is ensured, without the risk of delayed cracking. In addition to the positive modification of properties in terms of hydrogen absorption in comparison to known coating approaches for hot forming, with the method of the invention and the steel component of the invention, respectively, it is expressly desired that at least parts of the stated alloying elements are retained in the anticorrosion coating of the steel component.

In the coating produced in accordance with the invention, magnesium forms zinc-magnesium-rich phases which provide corrosion control through cathodic sacrifice as in the case of zinc coatings, but corrosion products are more stable in the case of substantially pure zinc coatings and therefore allow passivation. In this respect it should be noted that the electrochemical voltage potential of magnesium is less than for pure zinc, and so in fact the sacrificial effect of the magnesium is improved by comparison with zinc. The magnesium content of the aluminum-zinc alloy used in accordance with the invention is preferably in the range from 0.1 to 10 wt %.

Through the use of the above-defined aluminum-zinc alloy in the method of the invention, there is indeed an increase in the melting temperature of the coating material and hence in the energy requirement needed to maintain the metal melt, in comparison to nearly pure zinc coatings or zinc melts, and yet there is a substantial reduction in the risk of zinc-infiltrated cracking in the hot forming operation. When the method of the invention is performed, the strip temperatures or melt bath temperatures will be situated between those of hot dip galvanizing with a minimum of 85 wt % zinc fraction, and those of hot dip aluminizing (AlSi coating). The strip or melt bath temperatures when the method of the invention is performed are preferably in the range from 550° C. to 650° C.

Because of the production of the anticorrosion coating on the above-defined aluminum-zinc alloy, the cold formability of the manganese-boron steel strips or sheets thus coated is improved in comparison to that of corresponding steel substrates having an AlSi coating, thereby allowing more complex component geometries to be realized without cracking.

The effect of nickel is to raise the melting temperature of the coating, which therefore does not become too soft, or even melt, when the flat steel product coated accordingly is hot-formed. Another effect of nickel, like other elements in the coating, is to improve the coatability of the coating. The nickel content of the aluminum-zinc alloy used in accordance with the invention is preferably in the range from 0.2 to 10 wt %.

Also within the bounds of the present invention is the application of nickel prior to the actual melt dip finishing (hot dip coating) for the purpose of improving the coatability of the flat steel product and/or in the case of steel materials where wetting is difficult. This application of nickel may take place preferably by means of electrolytic coating. In this way it is possible to deposit very thin nickel layers on the flat steel product. For example, the thickness of the electrolytically applied nickel layer is at least 2 μm.

The addition of manganese to produce the metallic anticorrosion coating produces advantages in the hot forming of the flat steel product coated accordingly. By means of manganese, moreover, the wetability of the coating on the steel substrate is improved. The manganese content of the aluminum-zinc alloy used in accordance with the invention is preferably in the range from 0.1 to 10 wt %.

Silicon is only an optional element of the aluminum-zinc alloy of the invention. It acts as a diffusion blocker and is used to calm the melt bath when the coating composed of the aluminum-zinc alloy is applied by means of hot dip coating. The silicon content of the aluminum-zinc alloy used in accordance with the invention can be in the range from 0.1 to 10 wt %.

A key advantage of the anticorrosion coating of the invention is that on account of its aluminum fraction it allows only a low level of red rust to form. When the stated alloying elements of the coating of the invention are formulated in accordance with the invention, a smaller rust fraction is generated by comparison with existing metallic anticorrosion coatings. The other elements optionally present in the aluminum-zinc alloy, moreover, such as magnesium, calcium, nickel and/or manganese, for example, which behave passively under corrosion exposure, further improve the properties of the coating or of the flat steel product coated in accordance with the invention, as indicated above. On account of stable, zinc-rich phases which are present within the coating of the invention after hot forming, this coating also affords active corrosion control. As described above, by comparison with existing zinc-based anticorrosion coatings, which occasionally have a thin aluminum oxide skin on their surface, the coating of the invention has a high aluminum fraction over the whole layer thickness. As a result, the aforementioned barrier effect is achieved. Furthermore, there is a positive hardness profile within the coating.

By adaptation of the layer thickness addon it is possible to tailor the corrosion control when carrying out the method of the invention. The total layer thickness prior to hot forming may be in the range from 5 μm to 50 μm. The total layer thickness of the coating of the invention is preferably in the range from 10 μm to 25 μm.

According to one further advantageous refinement of the method of the invention, after the flat steel product has been coated with the anticorrosion coating, and before the steel component is formed, the flat steel product or the blank is subjected to a heat treatment in which it is heated to a temperature in the range between 300° C. and 700° C., preferably between 350° C. and 600° C., to produce an accumulation of iron in the coating. By means of an operation of this kind, referred to as preliminary alloying (>300° C.), the working time for the subsequent hot forming is lowered as a result of the high iron accumulation. After this heat treatment (preliminary alloying operation), the Fe concentration in the coating ought preferably to amount to more than 10 wt %. An Fe concentration of 85 wt % at maximum ought not to be exceeded.

In a further advantageous refinement of the method of the invention, after the flat steel product has been coated with the anticorrosion coating and before the steel component is formed from the blank, the flat steel product or the blank is subjected to a heat treatment in which it is heated to a temperature in the range from 50° C. to 300° C. As a result of this measure, prior to the hot forming proper, a so-called aging operation (artificial aging) is carried out. This may be done, for example, in a continuous oven or top hat oven by heating to a temperature within the stated range from 50° C. to 300° C. As a result, diffusion processes are induced within the system formed by the steel substrate and the metallic coating, with only a slight increase in the iron content of the coating. The benefit of this measure lies, for example, in the development of a suitable oxide layer on the surface or in the general homogenization of the coating.

A further advantageous refinement of the method of the invention provides for the heating of the blank or of the steel component to be carried out in an oven atmosphere which comprises between 5 vol % and 25 vol % oxygen. A further optimization for reducing the hydrogen absorption comes about if, according to a further refinement of the method of the invention, the heating of the blank or of the steel component is carried out in an oven atmosphere comprising dried air. As a result, the oven atmosphere is taken artificially to a low dew point.

Figure 4:
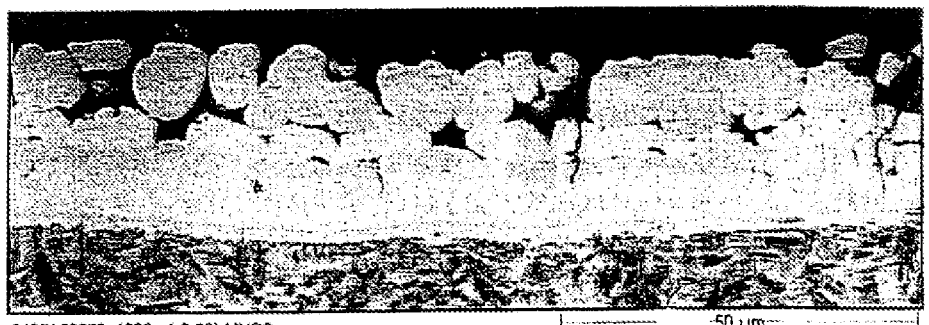
FIG. 4 is a close-up of a polished section of an example steel substrate coated according to a method of the present disclosure and taken after lying for five minutes after having been heated to a temperature of 900 degrees Celsius.
Figure 5:
FIG. 5 is a close-up of an example steel substrate coated according to a method of the present disclosure in a salt spray test after hot forming at 900 degrees Celsius and after lying for five minutes, wherein the four side-by-side images illustrate the development of red rust after 48 hours, 120 hours, 192 hours, and 600 hours, respectively.

The "dark holes" which can be made out in the top region of the coating in FIG. 4 come about as a result of partial etching of the polished sections. Without such partial etching, these locations would feature zinc-rich phases, as may be inferred from FIG. 5. The zinc-rich phases ensure the active corrosion control over the operating time window (working time window).

Example 1

An annealed cold strip of steel material containing 0.3-3 wt % manganese, having a yield point of 150-1100 MPa and a tensile strength of 300-1200 MPa, is subjected to alkaline spray degreasing and electrolytic degreasing. The degreasing bath comprises, at a concentration of about 15 g/l, a commercial cleaner which has more than 25% of sodium hydroxide, 1-5% of a fatty alcohol ether, and 5-10% of an ethoxylated, propoxylated, and methylated C12-18 alcohol. The bath temperature is approximately 65° C. The dwell time in the spray degreasing is 5 s. This is followed by brush cleaning. In its further course, the strip is subjected to hot dip coating. The metallic melt is composed of an aluminum-zinc alloy which comprises 35-70 wt % aluminum, 35-60 wt % zinc, 0.1-10 wt % magnesium, 0.1 up to 10 wt % Si, and up to 5 wt % Fe. Moreover, the aluminum-zinc alloy preferably comprises manganese and/or nickel in a total fraction of at most 15 wt %, it being possible for the manganese fraction to be up to 0.02 wt %. The total layer thickness of the coating formed from the aluminum-zinc alloy is set by means of a stripping device, such as stripping nozzles, for example, to a thickness in the range from 5 to 50 µm, preferably 10 to 25 µm. The strip thus coated is then wound to form a coil or divided into blanks of defined length, and, after optional interim storage, is supplied to a forming press for production of three-dimensionally formed, press-hardened steel components. Ahead of the forming press there is a size cutting apparatus by means of which blanks adapted to the contour of the steel component to be produced are cut to size from the unwound coil or from the pre-cut, typically rectangular, blanks. After having been cut to size, the blanks are heated to a forming temperature, which lies above the austenitization temperature of the steel substrate, and in the heated state are placed into the die of the forming press. In the course of forming, the sheet blank or the component formed from it undergoes rapid cooling as a result of contact with the cooled die. The cooling rates here are set such that a tempered or hardened microstructure is produced in the component.

Example 2

Hot strip (pickled) of grade 22MnB5 (1.5528) is subjected to alkaline spray degreasing and electrolytic degreasing. Additionally the strip undergoes brush cleaning at the alkaline spray degreasing stage. The degreasing bath comprises, in a concentration of about 20 g/l, a commercial cleaner which comprises 5-10% sodium hydroxide and 10-20% potassium hydroxide. The bath temperature is approximately 75° C. In its further course, the strip is subjected to hot dip coating. The metallic melt is composed of an aluminum-zinc alloy which comprises 35-70 wt % aluminum, 35-60 wt % zinc, 0.1-10 wt % magnesium, 0.1 up to 10 wt % Si, and up to 5 wt % Fe. The aluminum-zinc alloy further preferably comprises manganese and/or nickel in a total fraction of 15 wt % at most, it being possible for the manganese fraction to be up to 0.02 wt %. The total layer thickness of the metallic coating is set to a thickness in the range from 5 to 50 µm, preferably 10 to 25 µm, by means of a stripping device, such as by means of compressed-air nozzles or inert-gas nozzles, for example. The coated strip is subsequently wound to a coil or divided into blanks of defined length, and, after optional interim storage, is supplied to a forming press for the production of press-hardened steel components. Ahead of the forming press there is a size cutting device, by means of which blanks adapted to the contour of the steel component to be produced are cut to size from the unwound coil or from the pre-cut, typically rectangular, blanks. The cut-to-size blanks are then formed at room temperature into the shape or into a preform of the steel component to be produced (cold forming). Subsequently the (preformed) component is heated to a component temperature which lies above the austenitization temperature of the steel, and in the heated state is placed into a cooled forming die of the forming press. Within the cooled die, the component is formed optionally to a fully finished state. As a result of contact with the cooled die, the component undergoes rapid cooling, producing a tempered or hardened microstructure in the component.

Example 3

As example 1 or 2, but with the difference that after coating and before forming (press hardening), a preliminary alloying operation is carried out. For this purpose, the flat steel product or the blank is heated to a temperature in the range between 300° C. and 650° C., preferably between 350° C. and 600° C., thus producing accumulation of iron in the anticorrosion coating as a result of diffusion processes.

Example 4

As example 1 or 2, but with the difference that after coating and before forming (press hardening), an operation referred to as aging is carried out. For this purpose, the flat steel product or the blank is heated to a temperature in the range from 50° C. to 300° C. in a continuous annealing oven or in a top hat oven.

Example 5

As example 1, 2, 3 or 4, but with the difference that before the flat steel product is coated with the coating composed of the aluminum-zinc alloy, a nickel-comprising coating is first of all applied to the flat steel product. The nickel layer improves the coatability of the steel substrate. The nickel coating (base layer) is preferably applied electrolytically. The layer thickness of the nickel coating is set for example to a thickness in the range from 1 µm to 3 µm.

Optimum operating results are obtained in the examples specified above if the blank temperature or component temperature, in a conventional way, is not more than 940° C., more particularly 830-905° C. This is especially the case when the forming of the steel component is carried out as a hot forming operation following heating to the blank or component temperature, in such a way that the heated blank ("direct" method) or the heated steel component ("indirect" method) is placed into the respective forming die utilized subsequently, and a certain temperature loss is accepted. The hot forming which concludes the process in each case can be carried out with particular operational reliability when the blank temperature or component temperature is 850-880° C.

Heating to the blank or component temperature can take place, in a manner known per se, in passage within a continuous oven. Typical annealing times in this case are in the range of 3-15 min. Alternatively, however, it is also possible to perform heating by means of an inductively or conductively operating heating apparatus. This permits rapid heating to the particular mandated temperature.

In the course of heating, the oven atmosphere ought to comprise between 17% and 23% oxygen. A further optimization for the purpose of reducing the absorption of hydrogen by the steel substrate coated in accordance with the invention can be accomplished by introducing dried air. By this means, the oven atmosphere is taken artificially to a low dew point.

What is claimed is:

1. A steel component comprising:
   a steel substrate comprised of steel material having a yield point of 150-1100 MPa and a tensile strength of 300-1200 MPa;
   an anticorrosion coating disposed on the steel substrate, the anticorrosion coating comprising an aluminum-zinc alloy, the aluminum-zinc alloy comprising:
   35-70% by weight aluminum,
   35-60% by weight zinc,
   0.1-10% by weight magnesium,
   up to 10% by weight silicon, and
   up to 5% by weight iron,
   wherein when the aluminum-zinc alloy is applied to the steel substrate and forms the anticorrosion coating, the aluminum-zinc alloy forms layers from an outside inward comprising:
   an outer layer of aluminum-iron phases with zinc-rich phases,
   an interlayer of an aluminum-rich aluminum-iron compound, and
   a diffusion layer of an aluminum-rich iron solid solution.

2. The steel component of claim 1 wherein the anticorrosion coating is more than 5 µm thick.

3. The steel component of claim 1 wherein the anticorrosion coating comprises at least one of calcium, nickel, manganese, or other alkaline earth metals.

4. The steel component of claim 1 further comprising a nickel-containing base layer disposed between the steel substrate and the anticorrosion coating.

5. A method for producing steel components with metallic coatings that protect against corrosion, the method comprising:
   providing a flat steel product made from steel material that has a yield point of 150-1100 MPa and a tensile strength of 300-1200 MPa;
   coating the flat steel product with an anticorrosion coating composed of an aluminum-zinc alloy, the aluminum-zinc alloy comprising 35-70% by weight aluminum, 35-60% by weight zinc, 0.1-10% by weight magnesium, up to 10% by weight silicon, and up to 5% by weight iron;
   heating a blank made of the coated flat steel product to a blank temperature of at least 800 degrees Celsius;
   forming a steel component from the blank in a forming die; and
   hardening the steel component by cooling the steel component from a temperature at which the steel component is in a state suitable for development of a tempered microstructure or a hardened microstructure at a cooling rate sufficient to develop the tempered microstructure or the hardened microstructure,
   wherein, after hardening, the anticorrosion coating has layers from an outside inward comprising an outer layer of aluminum-iron phases with zinc-rich phases, an interlayer of an aluminum-rich aluminum-iron compound, and a diffusion layer of an aluminum-rich iron solid solution.

6. The method of claim 5 wherein the aluminum-zinc alloy comprises up to 15% by weight of elements from the group encompassing calcium, nickel, manganese, and/or other alkaline earth metals.

7. The method of claim 5 further comprising applying a nickel-containing coating to the flat steel product before the flat steel product is coated with the anticorrosion coating, wherein, after hardening, a nickel-containing base layer is disposed between the steel substrate and the anticorrosion coating.

8. The method of claim 5 further comprising subjecting the coated flat steel product or the blank to a heat treatment wherein the coated flat steel product or the blank of the coated flat steel product is heated to a temperature of 300-700 degrees Celsius to produce an accumulation of iron in the anticorrosion coating, the heat treatment occurring prior to forming the steel component from the blank in the forming die.

9. The method of claim 5 further comprising subjecting the coated flat steel product or the blank to a heat treatment wherein the coated flat steel product or the blank of the coated flat steel product is heated to a temperature of 50-300 degrees Celsius, the heat treatment occurring prior to forming the steel component from the blank in the forming die.

10. The method of claim 5 wherein prior to heating the blank to the blank temperature of at least 800 degrees Celsius the anticorrosion coating has a thickness of 5-50 µm.

11. The method of claim 5 wherein the heating of the blank of the coated flat steel product to the blank temperature of at least 800 degrees Celsius is performed in an oven atmosphere comprising 5-25% by volume oxygen.

12. The method of claim 5 wherein the heating of the blank of the coated flat steel product to the blank temperature of at least 800 degrees Celsius is performed in an oven atmosphere comprising dried air.

13. A method for producing steel components with metallic coatings that protect against corrosion, the method comprising:
   providing a flat steel product made from steel material that has a yield point of 150-1100 MPa and a tensile strength of 300-1200 MPa;
   coating the flat steel product with an anticorrosion coating composed of an aluminum-zinc alloy, the aluminum-zinc alloy comprising 35-70% by weight aluminum, 35-60% by weight zinc, 0.1-10% by weight magnesium, up to 10% by weight silicon, and up to 5% by weight iron;
   forming a steel component from a blank made of the coated flat steel product in a forming die;
   heating the steel component to a component temperature of at least 800 degrees Celsius; and
   hardening the steel component by cooling the steel component from a temperature at which the steel component is in a state suitable for development of a tempered microstructure or a hardened microstructure at a cooling rate sufficient to develop the tempered microstructure or the hardened microstructure, wherein, after hardening, the anticorrosion coating has layers from an outside inward comprising an outer layer of aluminum-iron phases with zinc-rich phases, an interlayer of an aluminum-rich aluminum-iron compound, and a diffusion layer of an aluminum-rich iron solid solution.

14. The method of claim 13 further comprising forming the steel component to a form-finished state after heating the steel component to the component temperature of at least 800 degrees Celsius.

15. The method of claim 13 further comprising applying a nickel-containing coating to the flat steel product before the flat steel product is coated with the anticorrosion coating, wherein, after hardening, a nickel-containing base layer is disposed between the steel substrate and the anticorrosion coating.

16. The method of claim 13 further comprising subjecting the coated flat steel product or the blank to a heat treatment wherein the coated flat steel product or the blank of the coated flat steel product is heated to a temperature of 300-700 degrees Celsius to produce an accumulation of iron in the anticorrosion coating, the heat treatment occurring prior to forming the steel component from the blank in the forming die.

17. The method of claim 13 further comprising subjecting the coated flat steel product or the blank to a heat treatment wherein the coated flat steel product or the blank of the coated flat steel product is heated to a temperature of 50-300 degrees Celsius, the heat treatment occurring prior to forming the steel component from the blank in the forming die.

18. The method of claim 13 wherein the heating of the blank of the steel component to the component temperature of at least 800 degrees Celsius is performed in an oven atmosphere that comprises 5-25% by volume oxygen.

19. The method of claim 13 wherein the coating of the flat steel product with the anticorrosion coating is applied to the flat steel product by way of hot dip coating.

* * * * *